United States Patent

[11] 3,603,901

| [72] | Inventor | Kazutoshi Matsumoto<br>Yokohama, Japan |
|---|---|---|
| [21] | Appl. No. | 861,780 |
| [22] | Filed | Sept. 29, 1969 |
| [45] | Patented | Sept. 7, 1971 |
| [73] | Assignee | Nippon Koei Company, Limited<br>Tokyo, Japan |
| [32] | Priority | Oct. 8, 1968 |
| [33] | | Japan |
| [31] | | 43/73312 |

[54] LINE TRAP
1 Claim, 4 Drawing Figs.

[52] U.S. Cl. .................................................. 333/76,
336/155, 336/192
[51] Int. Cl. ...................................................... H03h 7/10
[50] Field of Search ........................................... 333/70, 76,
79, 31; 317/61; 315/243

[56] References Cited
UNITED STATES PATENTS

| 2,521,513 | 9/1950 | Gray | 315/243 |
|---|---|---|---|
| 3,163,834 | 12/1964 | Malmstrom | 333/79 |
| 2,526,321 | 10/1950 | Beverly et al. | 333/31 C |
| 2,599,508 | 6/1952 | Allison | 333/31 C |
| 2,884,605 | 4/1959 | Dubilier | 333/31 C |
| 2,375,097 | 5/1945 | Gage | 333/31 C |

Primary Examiner—Herman Karl Saalbach
Assistant Examiner—C. Baraff
Attorney—Stevens, Davis, Miller & Mosher ABSTRACT: A line trap comprising a coil formed by winding a strip of electrically conducting material in convolutions, a supporting frame made of an insulating material for supporting the convolutions of said strip, a spacer for controlling the clearance between the convolutions of the strip, a pair of trap terminals each connected to one of the opposite ends of said coil, and tuning means and an arrester connected in shunt with said coil.

K. MATSUMOTO
INVENTOR

BY Stevens, Davis, Miller &
Mosher ATTORNEYS

LINE TRAP

This invention relates to line traps. More particularly, the invention is concerned with a line trap adapted to be inserted in series in a power line as an element for a carrier communication over power lines.

A line trap is generally positioned out of doors. Therefore, a line trap must satisfy the requirements of high dielectric strength to cope with a rise in temperature due to a current of high value of commercial frequency and lightnings, high impedance and high transmittability with respect to a high frequency carrier current, a mechanical strength resistible against an overcurrent and a long service life without maintenance.

In recent years, line traps capable of use with currents of high value have been in demand as a result of an increase in transmission capacity. If line traps of conventional type were adapted for use with currents of high value without remodeling, the overall size of the line traps would naturally be increased.

Accordingly, an object of the present invention is to provide a line trap which involves little AC loss, very good heat dissipation, high inductance, and high transmittability of the coil used and which permits a very small overall size and a very light weight in a line trap because of little ineffective space.

Another object of the invention is to provide a line trap which permits one to adapt the line trap to suit any condition as desired by using a plurality of units of such coil in combination which are connected in series or in shunt with one another.

To attain the ends, this invention provides a line trap which is characterized in that it comprises at least one coil formed by winding a strip of electrically conducting material of large width and small thickness.

Additional objects as well as features and advantages of the invention will become evident from the description set forth hereinafter when considered in conjunction with the accompanying drawings, in which.

Figure 1:
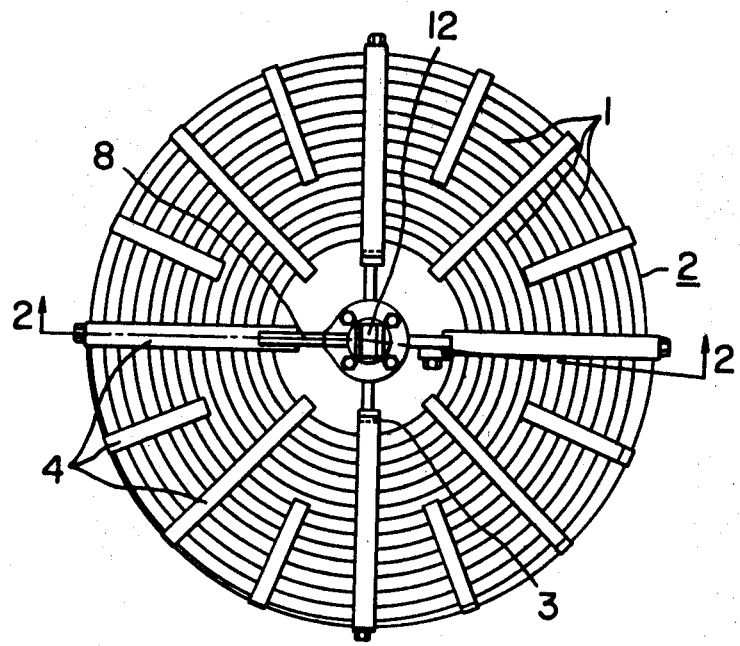
FIG. 1 is a plan view of one embodiment of the line trap according to this invention which is provided with two coils.
Figure 2:
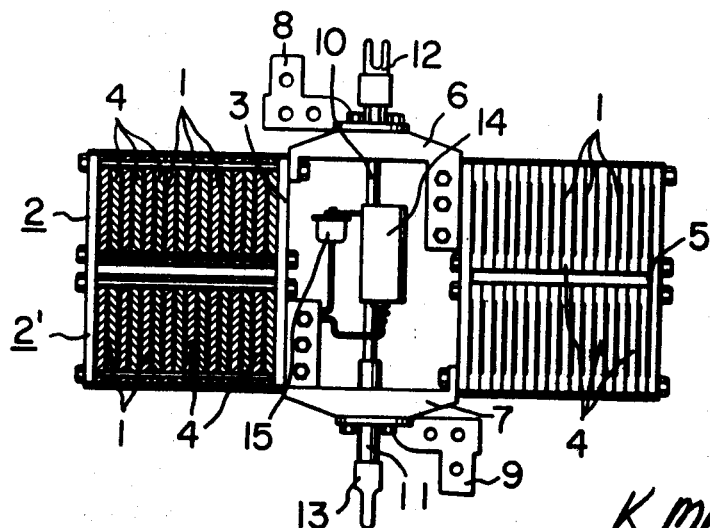
FIG. 2 is a longitudinal sectional front view of the line trap taken on the line 2—2 of FIG. 1.
Figure 3:
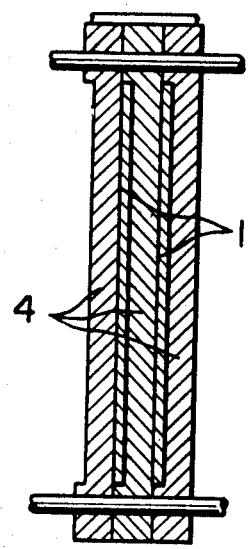
FIG. 3 is a fragmentary enlarged sectional view of essential portions of the line trap of FIG. 1.

The invention will now be explained with reference to the embodiment provided with two coils illustrated in the accompanying drawings. In FIGS. 1 to 3, the line trap comprises two coils 2 and 2' disposed one over the other, each coil being formed by winding a strip of copper or aluminum sheet 1 in convolutions with a small clearance between the convolutions. Each coil is formed with a central axial opening.

The upper and lower convolute coils 2 and 2' are fixed in place by means of supporting frames 3 and 3, spacers 4 with grooves therein made of an insulating material, and binding bolts laid through said supporting frames 3 and said spacers 4. The outer ends of the coils 2 and 2' are connected together by a metal plate 5. Mounted on the upper and lower ends of the supporting frame 3 are electrically conducting brackets 6 and 7 which are connected at their inner ends to the inner ends of the coils 2 and 2' respectively. The upper electrically conducting bracket 6 is firmly secured at its central portion to a stay bolt 10 which has a lower end portion extending through an insulating pipe 11 mounted in the central portion of the lower electrically conducting bracket 7. Hanger fixtures 12 and 13 are secured to opposite ends of the stay bolt 10 respectively. L-shaped trap terminals 8 and 9 are mounted on the outer side of the central portion of the electrically conducting brackets 6 and 7 respectively for horizontal swinging motion. Tuning means 14 and an arrester 15 are connected to the stay bolt 10, with terminals of said tuning means and said arrester being connected in shunt with the coils.

It should be noted that the line trap according to this invention includes at least one coil made by using a strip of metal sheet of small thickness and large width as a conductor which is wound in convolutions, a large space being provided between each turn of the metal sheet 1. This arrangement offers many advantages over the prior art line traps which use a round wire, square wire or strand for forming a coil. Since the coil of the line trap according to this invention has a larger surface area than the coils of conventional line traps, the former can dissipate heat more rapidly than the latter. Moreover, since the surfaces of the convolutions of the strip forming the coil are disposed vertically, air flows smoothly in convection, so that the heat produced in the coil can be dissipated effectively. The surfaces of convolutions are disposed in parallel with the vertical axis of the coil, so that the magnetic flux produced in the coil is disposed in parallel with the surfaces of convolutions. Since this arrangement prevents the magnetic flux from intersecting the surfaces of convolutions, the production of an eddy current is minimized. The fact that the metal strip used for making the coil has a small thickness is conducive to reduced skin effect. The loss consists mostly of a DC loss and an AC loss due to proximity effect.

Structurally, the present invention is characterized in that the sheet 1 is fixed in the grooves of the spacers 4, having at both sides thereof the supporting frames 3, 3 made of an insulating material, and thoroughly bound by means of the binding bolts. This provides the strength required to resist mechanical shock during transportation or due to an overcurrent, or the like. It is also one of the structural characteristics of the present invention that, compared with conventional coils for passing heavy current in which a plurality of electrically conducting coils must be connected in shunt, a line trap according to this invention permits the use of a wider sheet 1 for passing heavy current. This makes it possible to realize a line trap which is simple in structure and easy to manufacture. A further characteristic of the present invention is in the fact that the trap terminals 8 and 9 are L-shaped and able to move in a horizontal plane, so that the external lines can be connected to the terminals from every direction, horizontal or vertical.

Tests were conducted on the line trap of this invention by using metal strips of different dimensions. The results of tests are as follows:

Example 1

A strip of aluminum sheet of 100 millimeter wide and 1.5 millimeter thick with a conductivity of 61 percent was used for making a coil with inductance of about 100 $\mu$. The results of experiments conducted on a line trap in which such coil was mounted show that the distribution of temperature on the surface of each convolution across the width thereof is good with a temperature differential of less than 10 percent.

Example 2

A strip of aluminum sheet of 100 millimeter wide and 1.5 millimeter thick with a conductivity of 61 percent was used for making two coils with 17 convolutions. The two coils were connected in series with each other to form a line trap of 60 kg. in weight with an inductance of 300 $\mu$h. and a current capacity of 600 amperes. The results of experiments conducted on this line trap show that a rise in temperature is 80° C.

Figure 4:
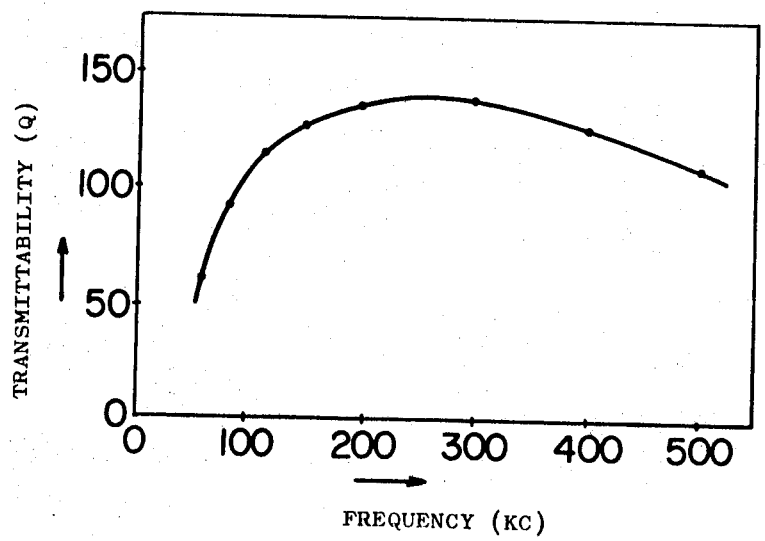
FIG. 4 is a diagram showing a transmittability-frequency characteristics curve of the line trap according to this invention.

The transmittability of a coil is generally expressed by the formula $\omega L/R$ where $\omega = 2\omega f$, R is a loss of the coil in the carrier frequency and L is an inductance. If the transmittability Q expressed by the above formula is low, it is not possible to provide a high impedance when such coil is connected with a capacitor for parallel resonance. Therefore, the transmittability of coils is generally selected at a level not less than 30 with respect to the carrier frequency used. The coil according to this invention has little AC loss as aforementioned. The results of experiments show that the transmittability Q is not less than 50 with a carrier frequency of 50 to 500 kilocycles as shown in FIG. 4.

The present invention permits one to provide a line trap of desired inductance or current capacity by using more than two coils laid one over another and connected in a series or in shunt with one another. The fact that the coil is small in size permits one to use a small supporting frame and to obtain an overall small size and a light weight in a line trap. This also permits one to obtain a line trap of large capacity for a given volume. The maximum inductance and current capacity of line traps of the prior art are 300 $\mu$h. and 4,000 amperes. This invention permits one to provide a line trap with a maximum inductance of 100 $\mu$h. and a maximum current capacity of 12,000 amperes.

What we claim is:

1. A line trap comprising two coils, each coil being formed in convolution by winding a strip of electrically conducting material of relatively large width and small thickness, characterized in that said conducting material is fixed in place to form a large vent by means of spacers with grooves therein, said two coils being bound together as a unit at both of the outside and inside by means of supporting frames made of an insulating material and by binding bolts extending therethrough, the outermost ends of said two coils being connected together by a conducting metal, the inner ends of said two coils being connected to electrically conducting brackets which are mounted on the upper and lower portions of said supporting frames within the coils, a stay bolt being fixed at the center portion of the upper electrically conducting bracket and extending through an insulating pipe mounted in the central portion of the lower conducting bracket, upper and lower hanger fixtures firmly fixed at both ends of said stay bolt, L-shaped trap terminals mounted for movement in the horizontal plane on the outer side of the central portion of each conducting bracket, and tuning means and an arrester being connected in shunt with the said two coils which are connected in series.